(12) United States Patent
Khan et al.

(10) Patent No.: US 10,928,613 B2
(45) Date of Patent: *Feb. 23, 2021

(54) OPTICAL SYSTEM FOR HEAD-MOUNTED DISPLAY

(71) Applicant: Apple Inc., Cupertino, CA (US)

(72) Inventors: Sajjad A. Khan, Santa Clara, CA (US); Nan Zhu, San Jose, CA (US); Graham B. Myhre, San Jose, CA (US); Brent J. Bollman, Mountain View, CA (US); Tyler Anderson, Sunnyvale, CA (US); Weibo Cheng, Santa Clara, CA (US); John N. Border, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,750

(22) Filed: Jan. 30, 2020

(65) Prior Publication Data

US 2020/0166738 A1 May 28, 2020

Related U.S. Application Data

(63) Continuation of application No. 16/224,561, filed on Dec. 18, 2018, now Pat. No. 10,591,707, which is a
(Continued)

(51) Int. Cl.
*G02B 27/01* (2006.01)
*G02B 17/08* (2006.01)
(Continued)

(52) U.S. Cl.
CPC ..... *G02B 17/0856* (2013.01); *G02B 27/0018* (2013.01); *G02B 27/0172* (2013.01);
(Continued)

(58) Field of Classification Search
None
See application file for complete search history.

(56) References Cited

U.S. PATENT DOCUMENTS

| 5,357,372 A | 10/1994 | Chen et al. |
| 5,619,377 A | 4/1997 | Rallison |

(Continued)

FOREIGN PATENT DOCUMENTS

| CN | 1316063 A | 10/2001 |
| CN | 205139462 U | 4/2016 |

(Continued)

*Primary Examiner* — Joseph R Haley
(74) *Attorney, Agent, or Firm* — Treyz Law Group, P.C.; G. Victor Treyz; Joseph F. Guihan

(57) ABSTRACT

A head-mounted display may include a display system and an optical system in a housing. The display system may have a pixel array that produces light associated with images. The display system may also have a linear polarizer through which light from the pixel array passes and a quarter wave plate through which the light passes after passing through the quarter wave plate. The optical system may be a catadioptric optical system having one or more lens elements. The lens elements may include a plano-convex lens and a plano-concave lens. A partially reflective mirror may be formed on a convex surface of the plano-convex lens. A reflective polarizer may be formed on the planar surface of the plano-convex lens or the concave surface of the plano-concave lens. An additional quarter wave plate may be located between the reflective polarizer and the partially reflective mirror.

20 Claims, 8 Drawing Sheets

Related U.S. Application Data continuation of application No. 15/434,623, filed on Feb. 16, 2017, now Pat. No. 10,203,489.

(60) Provisional application No. 62/383,911, filed on Sep. 6, 2016, provisional application No. 62/370,170, filed on Aug. 2, 2016.

(51) Int. Cl.
*G02B 27/28* (2006.01)
*G02B 27/00* (2006.01)
*G09G 3/00* (2006.01)

(52) U.S. Cl.
CPC ......... *G02B 27/283* (2013.01); *G02B 27/286* (2013.01); *G09G 3/003* (2013.01); *G02B 2027/0138* (2013.01)

(56) References Cited

U.S. PATENT DOCUMENTS

| | | |
|---|---|---|
| 5,644,436 A | 7/1997 | Togino et al. |
| 5,715,023 A | 2/1998 | Hoppe |
| 5,949,583 A | 9/1999 | Rallison et al. |
| 6,075,651 A | 6/2000 | Hoppe |
| 6,204,974 B1 | 3/2001 | Spitzer |
| 6,853,491 B1 | 2/2005 | Ruhle et al. |
| 7,345,822 B1 | 3/2008 | Yamazaki |
| 8,488,246 B2 | 7/2013 | Border et al. |
| 9,555,589 B1 | 1/2017 | Ambur et al. |
| 2011/0221659 A1 | 9/2011 | King, III et al. |

FOREIGN PATENT DOCUMENTS

| | | |
|---|---|---|
| CN | 205246924 U | 5/2016 |
| EP | 0718645 A2 | 6/1996 |
| EP | 1096293 A2 | 5/2001 |
| JP | H07261088 A | 10/1995 |
| JP | H08223509 A | 8/1996 |
| JP | 2000180785 A | 6/2000 |
| JP | 2000249984 A | 9/2000 |
| JP | 2000275566 A | 10/2000 |
| JP | 2001042257 A | 2/2001 |
| JP | 2001166227 A | 6/2001 |
| JP | 2002131693 A | 5/2002 |
| JP | 2003504663 A | 2/2003 |
| JP | 2018500584 A | 1/2018 |
| KR | 10-2001-0073072 A | 7/2001 |

OPTICAL SYSTEM FOR HEAD-MOUNTED DISPLAY

This application is a continuation of U.S. patent application Ser. No. 16/224,561, filed Dec. 18, 2018, which is a continuation of U.S. patent application Ser. No. 15/434,623, filed Feb. 16, 2017, which claims the benefit of provisional patent application No. 62/383,911, filed on Sep. 6, 2016 and provisional patent application No. 62/370,170, filed Aug. 2, 2016, all of which are hereby incorporated by reference herein in their entireties.

BACKGROUND

This relates generally to optical systems and, more particularly, to optical systems for head-mounted displays.

Head-mounted displays such as virtual reality glasses use lenses to display images for a user. A microdisplay may create images for each of a user's eyes. A lens may be placed between each of the user's eyes and a portion of the microdisplay so that the user may view virtual reality content.

If care is not taken, a head-mounted display may be cumbersome and tiring to wear. Optical systems for head-mounted displays may use arrangements of lenses that are bulky and heavy. Extended use of a head-mounted display with this type of optical system may be uncomfortable.

It would therefore be desirable to be able to provide improved head-mounted.

SUMMARY

A head-mounted display may include a display system and an optical system. The display system and optical system may be supported by a housing that is worn on a user's head. The head-mounted display may use the display system and optical system to present images to the user while the housing is being worn on the user's head.

The display system may have a pixel array that produces image light associated with the images. The display system may also have a linear polarizer through which image light from the pixel array passes and a quarter wave plate through which the light passes after passing through the linear polarizer.

The optical system may be a catadioptric optical system having one or more lens elements formed from clear materials such as glass or plastic and having reflective structures. The lens elements may include a plano-convex lens element and a plano-concave lens element. The plano-convex lens element may have a convex surface and an opposing planar surface. The plano-concave lens element may have a concave surface and an opposing planar surface that faces the planar surface of the convex lens element.

A partially reflective mirror may be formed on a convex surface of the plano-convex lens element. A reflective polarizer may be formed on the planar surface of the plano-convex lens or the concave surface of the plano-concave lens. An additional quarter wave plate may be located between the reflective polarizer and the partially reflective mirror.

DETAILED DESCRIPTION

Head-mounted displays may be used for virtual reality and augmented reality systems. For example, a pair of virtual reality glasses that is worn on the head of a user may be used to provide a user with virtual reality content.

Figure 1:
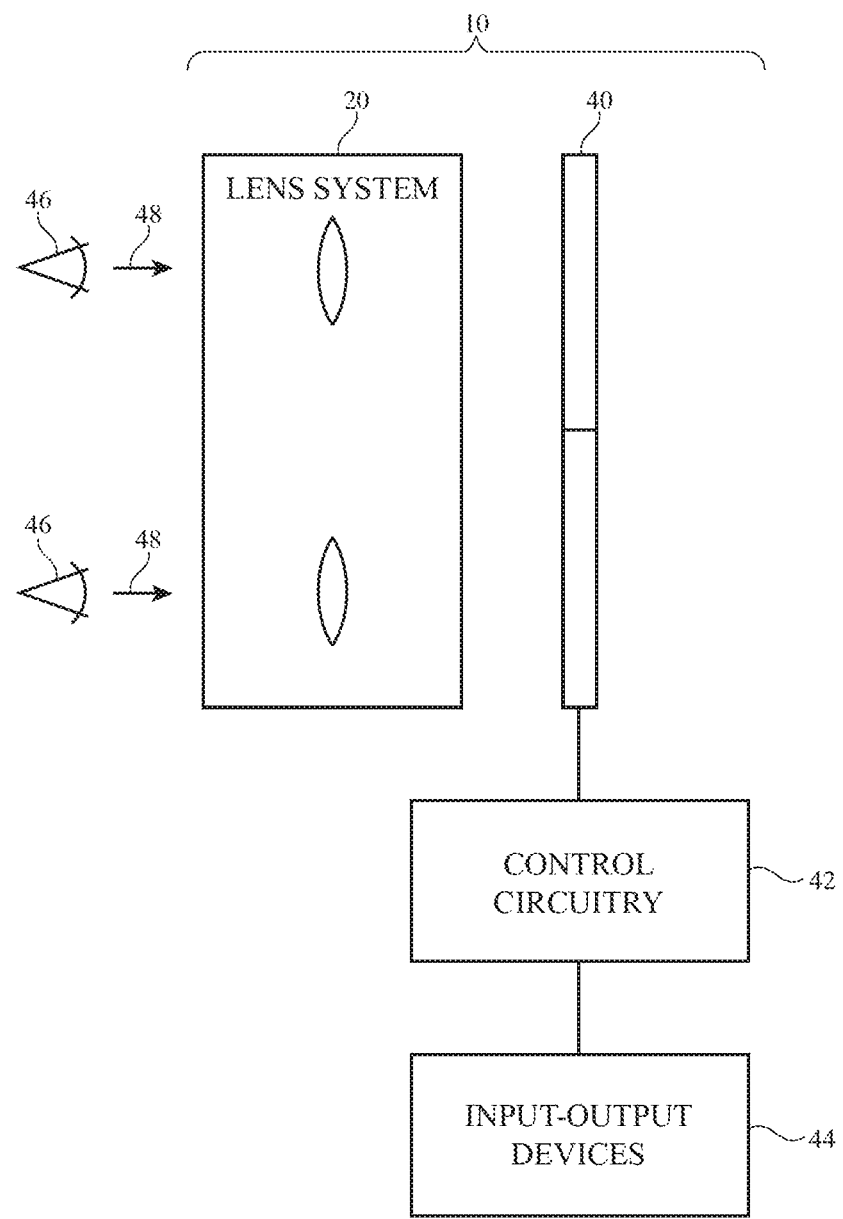
FIG. 1 is a diagram of an illustrative head-mounted display in accordance with an embodiment.

An illustrative system in which a head-mounted display such as a pair of virtual reality glasses is used in providing a user with virtual reality content is shown in FIG. 1. As shown in FIG. 1, virtual reality glasses (head-mounted display) 10 may include a display system such as display system 40 that creates images and may have an optical system such as optical system 20 through which a user (see, e.g., user's eyes 46) may view the images produced by display system 40 by looking in direction 48.

Display system 40 may be based on a liquid crystal display, an organic light-emitting diode display, an emissive display having an array of crystalline semiconductor light-emitting diode dies, and/or displays based on other display technologies. Separate left and right displays may be included in system 40 for the user's left and right eyes or a single display may span both eyes.

Visual content (e.g., image data for still and/or moving images) may be provided to display system (display) 40 using control circuitry 42 that is mounted in glasses (head-mounted display) 10 and/or control circuitry that is mounted outside of glasses 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such as virtual reality content (e.g., computer-generated content associated with a virtual world), pre-recorded video for a movie or other media, or other images. Illustrative configurations in which control circuitry 42 provides a user with virtual reality content using display system 40 may sometimes be described herein as an example. In general, however, any suitable content may be presented to a user by control circuitry 42 using display system 40 and optical system 20 of glasses 10.

Input-output devices 44 may be coupled to control circuitry 42. Input-output devices 44 may be used to gather user input from a user, may be used to make measurements on the environment surrounding glasses 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensor, accelerometers, gyroscopes, and/or other sensors for measuring orientation, position, and/or movement of glasses 10, proximity sensors, capacitive touch sensors, strain gauges, gas sensors, pressure sensors, ambient light sensors, and/or other sensors). If desired, input-output devices 44 may include one or more cameras (e.g., cameras for capturing images of the user's surroundings, cameras for performing gaze detection operations by viewing eyes 46, and/or other cameras).

Figure 2:
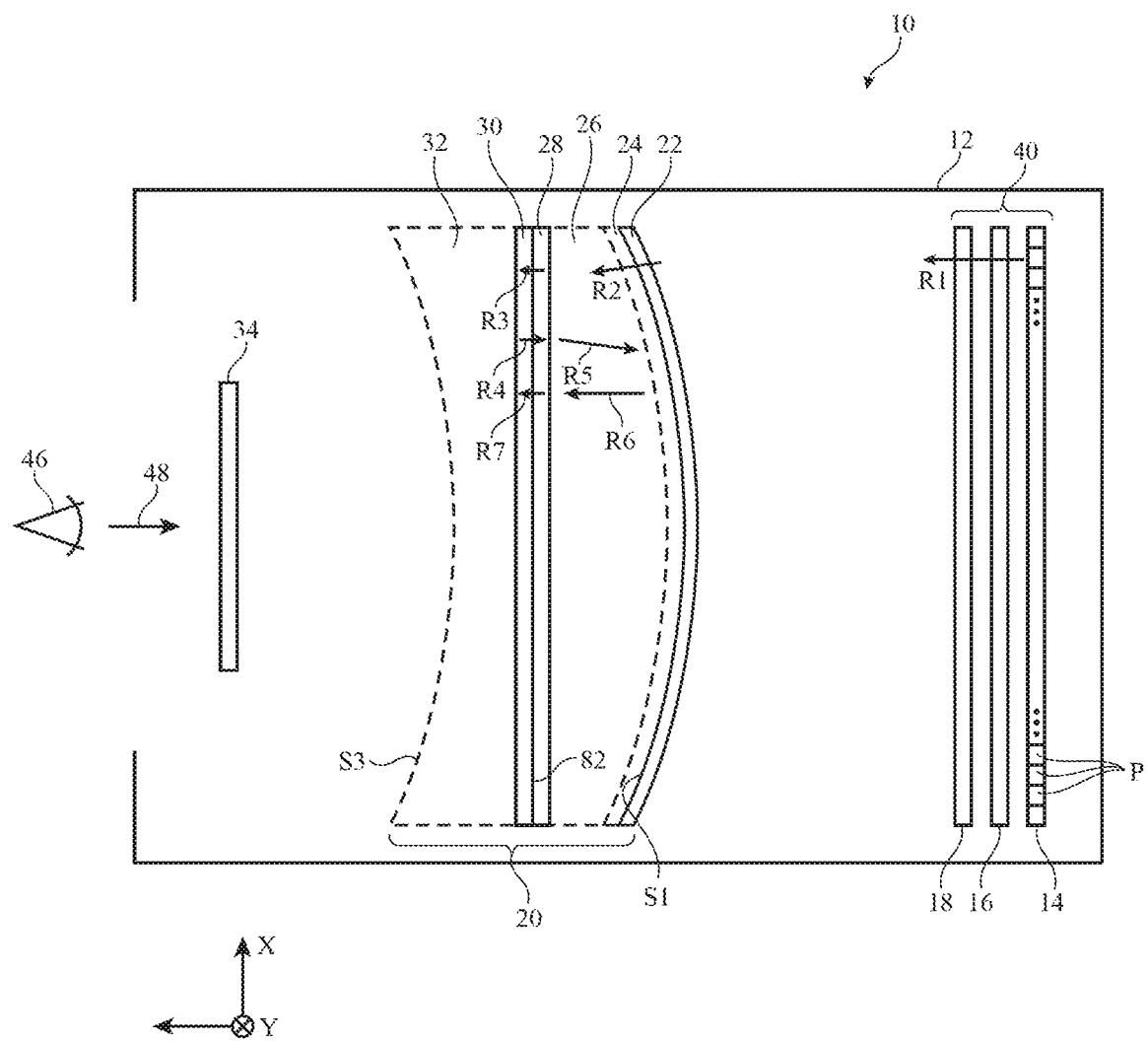
FIG. 2 is a diagram of an illustrative head-mounted display showing components of an illustrative optical system in the head-mounted display in accordance with an embodiment.

FIG. 2 is a cross-sectional side view of glasses 10 showing how optical system 20 and display system 40 may be supported by head-mounted support structures such as housing 12 for glasses 10. Housing 12 may have the shape of a frame for a pair of glasses (e.g., glasses 10 may resemble eyeglasses), may have the shape of a helmet (e.g., glasses 10 may form a helmet-mounted display), may have the shape of a pair of goggles, or may have any other suitable housing shape that allows housing 12 to be worn on the head of a user. Configurations in which housing 12 supports optical system 20 and display system 40 in front of a user's eyes (e.g., eyes 46) as the user is viewing system 20 and display system 40 in direction 48 may sometimes be described herein as an example. If desired, housing 12 may have other suitable configuration.

Housing 12 may be formed from plastic, metal, fiber-composite materials such as carbon-fiber materials, wood and other natural materials, glass, other materials, and/or combinations of two or more of these materials.

Input-output devices 44 and control circuitry 42 may be mounted in housing 12 with optical system 20 and display system 40 and/or portions of input-output devices 44 and control circuitry 42 may be coupled to glasses 10 using a cable, wireless connection, or other signal paths.

Display system 40 and the optical components of glasses 10 may be configured to display images for user 46 using a lightweight and compact arrangement. Optical system 10 may, for example, be based on catadioptric lenses.

Display system 40 may include a source of images such as pixel array 14. Pixel array 14 may include a two-dimensional array of pixels P that emits image light (e.g., organic light-emitting diode pixels, light-emitting diode pixels formed from semiconductor dies, liquid crystal display pixels with a backlight, liquid-crystal-on-silicon pixels with a frontlight, etc.). A polarizer such as linear polarizer 16 may be placed in front of pixel array 14 and/or may be laminated to pixel array 14 to provide polarized image light. Linear polarizer 16 may have a pass axis aligned with the X-axis of FIG. 2 (as an example). Display system 40 may also include a wave plate such as quarter wave plate 18 to provide circularly polarized image light. The fast axis of quarter wave plate 18 may be aligned at 45 degrees to the pass axis of linear polarizer 16. Quarter wave plate 18 may be mounted in front of polarizer 16 (between polarizer 16 and optical system 20). If desired, quarter wave plate 18 may be attached to polarizer 16 (and display 14).

Optical system 20 may include lens elements such as lens elements 26 and 32. Lens element 26 may be a plano-convex lens (lens element) with a convex surface facing display system 40. Optional lens element 32 may be a plano-concave lens (lens element) with a concave surface S3 facing the user (eyes 46).

Optical structures such as partially reflective coatings, wave plates, reflective polarizers, linear polarizers, antireflection coatings, and/or other optical components may be incorporated into glasses 10 (e.g., system 20, etc.). These optical structures may allow light rays from display system 40 to pass through and/or reflect from surfaces in optical system 20 such as surfaces S1, S2, and S3, thereby providing optical system 20 with a desired lens power.

Consider, as an example, image light ray R1. As image light ray R1 exits display 14 and passes through linear polarizer 16, ray R1 becomes linearly polarized in alignment with the pass axis of linear polarizer 16. The pass axis of linear polarizer 16 may be, for example, aligned with the X-axis of FIG. 2. After passing through polarizer 16, ray R1 passes through wave plate 18, which may be a quarter wave plate. As ray R1 passes through quarter wave plate 18, ray R1 becomes circularly polarized.

A partially reflective mirror (e.g., a metal mirror coating or other mirror coating such as a dielectric multilayer coating with a 50% transmission and a 50% reflection) such as partially reflective mirror 22 may be formed on the convex surface of lens element 26. When circularly polarized ray R1 strikes partially reflective mirror 22, a portion of ray R1 will pass through partially reflective mirror 22 to become reduced-intensity ray R2. Ray R2 will be refracted (partially focused) by the shape of convex surface S1 of lens element 26.

Ray R2 is circularly polarized. A second quarter wave plate such as quarter wave plate 28 may be included in optical system 20 to convert the circular polarization of ray R2 into linear polarization. Quarter wave plate 28 may, for example, convert circularly polarized ray R2 into a ray R3 with a linear polarization aligned with the Y-axis of FIG. 2.

Reflective polarizer 30 may be formed adjacent to quarter wave plate 28. With one illustrative configuration, reflective polarizer 30 and quarter wave plate 28 are planar layers and may be formed on the planer surface of lens element 26. Reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30. In the illustrative arrangement of FIG. 2, reflective polarizer 30 has a reflection axis that is aligned with the Y-axis, so ray R3 will reflect from reflective polarizer 30 at surface S2 as reflected ray R4.

Reflected ray R4 has a linear polarization aligned with the Y-axis. After passing through quarter wave plate 28, the linear polarization of ray R4 will be converted into circular polarization (i.e., ray R4 will become circularly polarized ray R5).

Circularly polarized ray R5 will travel through lens element 26 and a portion of ray R5 will be reflected in the Z direction by the partially reflective mirror 22 on the convex surface S1 of lens element 26 as reflected ray R6. The reflection from the curved shape of surface S1 provides optical system 20 with additional optical power. At the same time, the portion of ray R5 that is transmitted by partially reflective mirror 22 is converted from circularly polarized light to linearly polarized light by quarter wave plate 18. This linearly polarized light has a polarization aligned with the Y axis so that it is absorbed by linear polarizer 16. As a result, contrast degradation and stray light artifacts from the transmitted portion of ray R5 are prevented in the image viewed by the user.

Ray R6 is circularly polarized. After passing back through lens element 26 and quarter wave plate 28, ray R6 will become linearly polarized (ray R7), where the linear polarization of ray R7 is aligned with the X-axis of FIG. 2, which is parallel to the pass axis of reflective polarizer 30. Accordingly, ray R7 will pass through reflective polarizer 30 to provide a viewable image to the user.

If desired, glasses 10 may include an additional linear polarizer such as clean-up linear polarizer 34. Clean-up linear polarizer 34 has a pass axis aligned with the pass axis of reflective polarizer 30 (i.e., parallel to the X-axis in this example) and will therefore remove any residual non-X-axis polarization from ray R7 before ray R7 reaches viewers eye 46.

If desired, an additional lens element such as element 32 with an additional lens element surface (surface S3) may be incorporated into optical system 20. Surface S3 may be concave and/or convex and may be used for additional focusing, distortion correction, etc. Element 32 may have a planar surface facing lens element 26 and a curved surface (S3) facing viewer 46. Surface S3 may be concave, convex, aspherical, freeform, concave in parts and convex in parts, or may have other suitable shapes. Curved surfaces in system 20 such as surfaces S1 and/or S3 may be aspherical to improve sharpness or reduce distortion in the image presented to the user. Lens element 32 may, for example, be placed with its planar surface adjacent to reflective polarizer 30, quarter wave plate 28, and the planar surface of element 26 (i.e., reflective polarizer 30 and quarter wave plate 28 may be sandwiched between the planar surfaces of lens elements 32 and 26 without an air gap).

Although element 32 provides additional focusing power, optical system complexity and weight may, if desired, be reduced by omitting element 32. Moreover, quarter wave plate 28 need not be located on the planar surface of element 26, but rather may be located at any position between partially reflective mirror 22 and reflective polarizer 30. For example, quarter wave plate 28 may be moved to position 24 between curved partially reflective mirror 22 and the convex surface of element 26.

Figure 3:
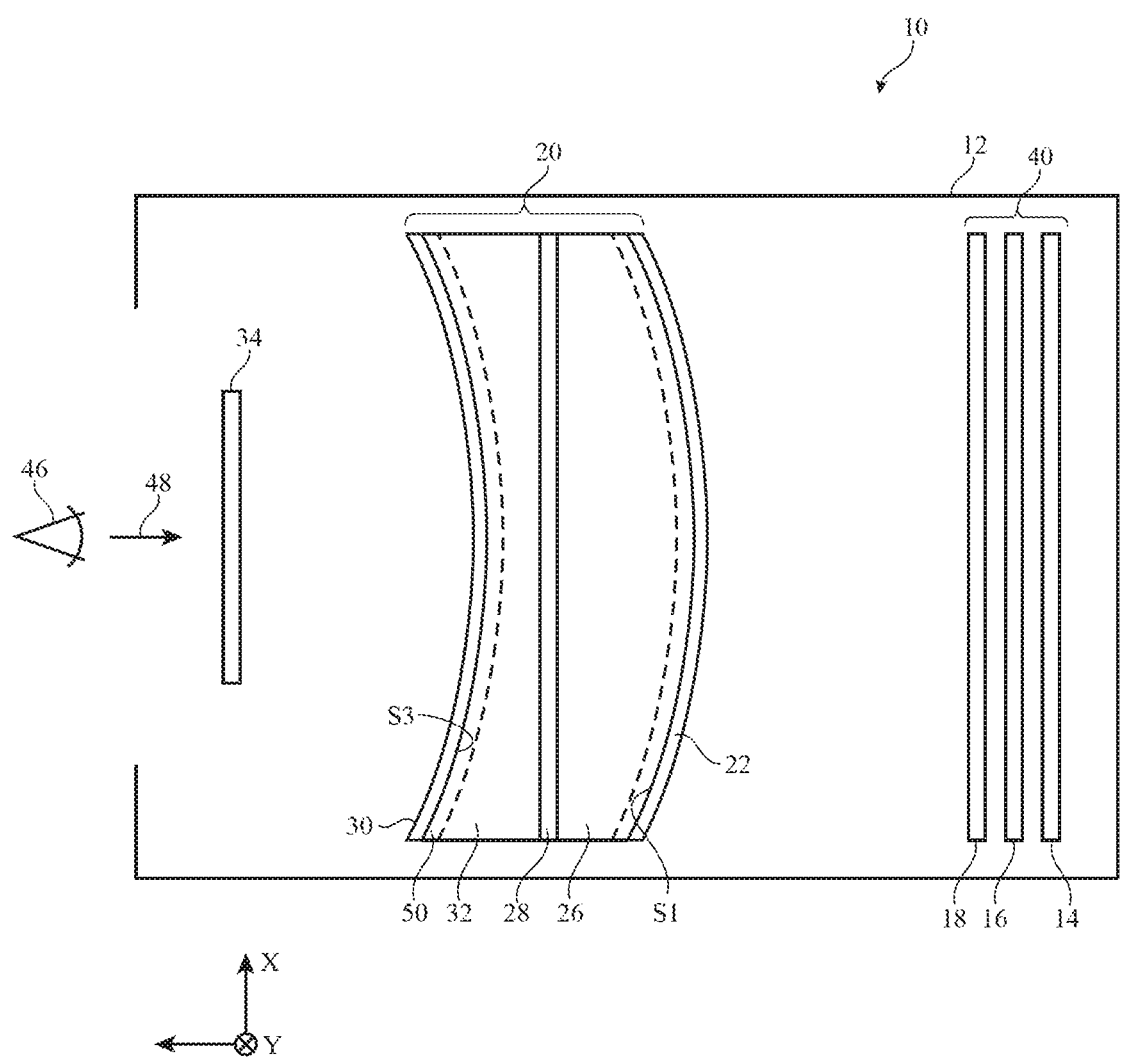
FIG. 3 is a diagram of a head-mounted display with another illustrative optical system in accordance with an embodiment.

FIG. 3 is a cross-sectional side view of glasses 10 in an illustrative configuration in which optical system includes plano-convex lens element 26 and plano-curved lens element 32 (e.g., plano-concave, plano-aspherical, etc.) and in which reflective polarizer 30 is formed on curved surface S3 of lens element 32. Because surface S3 is curved, additional optical power and/or distortion correction capabilities or a larger display field of view may be provided by allowing image light to reflect from reflective polarizer 30 when reflective polarizer 30 has been curved to the shape of surface S3. If desired, quarter wave plate 28 may be moved from the position shown in FIG. 3 to a position adjacent to reflective polarizer 30 of FIG. 3 (e.g., in location 50) or may be moved to position 24 of FIG. 2. The configuration of FIG. 3 is merely illustrative.

Figure 4:
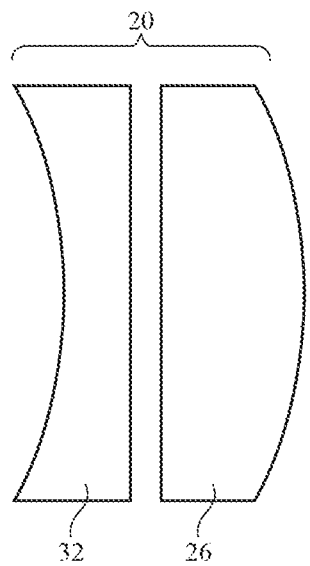
FIGS. 4 and 5 are cross-sectional side views of illustrative lens elements of the type that may be incorporated into a head-mounted display optical system in accordance with an embodiment.

FIG. 4 shows how lens elements 32 and 26 may, if desired, be separated by an air gap in system 20. Antireflection coatings may be provided on the planar surfaces of element 32 and/or 26 to reduce reflections, if desired.

Figure 5:
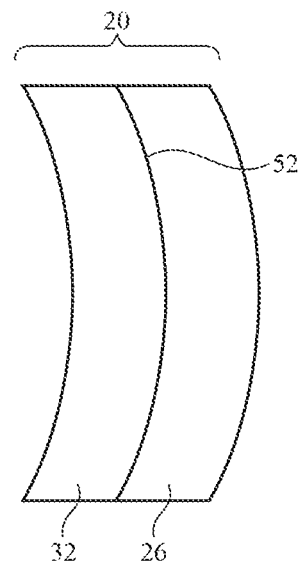

In the illustrative configuration of FIG. 5, system 20 is formed from lens elements with additional curved surfaces. In this arrangement, elements 32 and 26 are meniscus lenses and meet at curved mating surface 52. The optical systems of FIGS. 4 and 5 may include quarter wave plates, partially reflecting mirrors, and reflective polarizers to form catadioptric lenses as described in connection with catadioptric lens systems (lenses) 20 of FIGS. 2 and 3.

Figure 6:
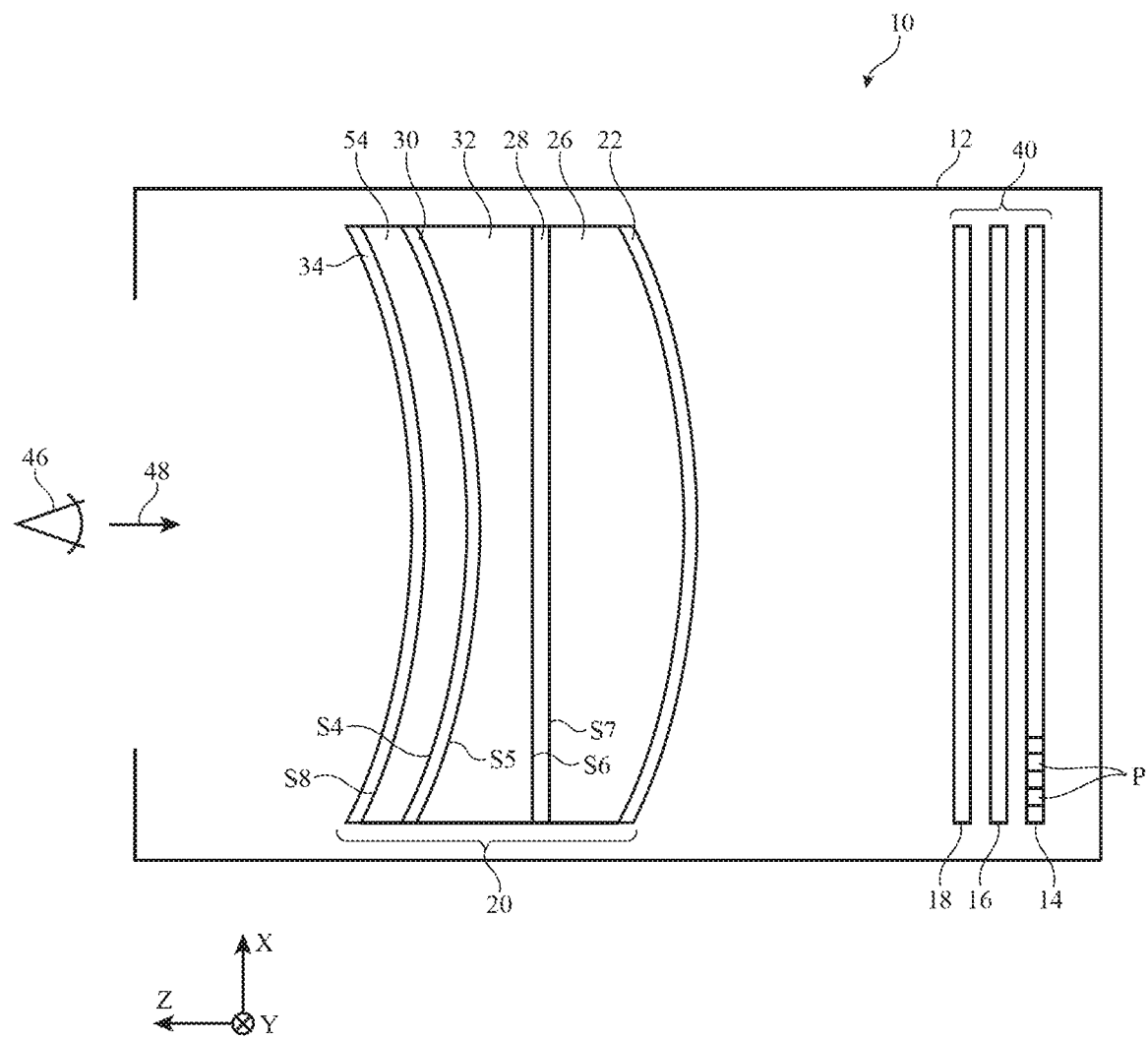
FIGS. 6 and 7 are diagrams of additional illustrative head-mounted displays in accordance with embodiments.

In the illustrative configuration of FIG. 6, reflective polarizer 30 has been formed on the surface of additional lens element 54. Reflective polarizer 30 and lens element 54 may be attached to the adjacent curved surface of lens element 32 using optically clear adhesive (as an example). If desired, the surface of lens element 54 facing user 46 may have a curved surface. The thickness of lens element 54 may, if desired, be constant (e.g., the thickness of element 54 may vary by less than 10% or less than 5% or other suitable amount across its diameter). In addition, linear polarizer 34 may be formed on the curved surface of lens element 54 that faces user 46 to help suppress reflections of stray ambient light. Linear polarizer 34 may be oriented so that the pass axis of linear polarizer 34 is aligned with the X axis so that rays of image light such as light ray R7 of FIG. 2 will pass to user 46 for viewing while ambient light rays passing through polarizer 34 (in the −Z direction) will become X-polarized due to the X-axis pass axis orientation of linear polarizer 34 and will therefore not be reflected by reflective polarizer 30 (which has a reflective axis oriented with the Y axis). Obliquely oriented ambient light rays will also tend to be reflected away from user 46 due to the curved surfaces of the lens elements in system 20. The presence of linear polarizer 34 will therefore help to reduce stray light reflections toward user 46 from the inwardly facing side of system 20.

Outwardly facing surface S4 of lens element 54 may be curved (e.g., convex) and opposing mating inwardly facing surface S5 of lens element 32 may be correspondingly curved (e.g., concave). With one illustrative configuration, surfaces S4 and S5 may be rotationally symmetric about the Z axis of FIG. 6 (e.g., lens elements 54 and 32 may be dome lenses and surfaces S4 and S5 may be dome lens surfaces). This allows lens element 54 to be rotated relative to lens element 32 (e.g., to align reflective polarizer 30 to quarter wave plate 28, etc.).

Figure 7:
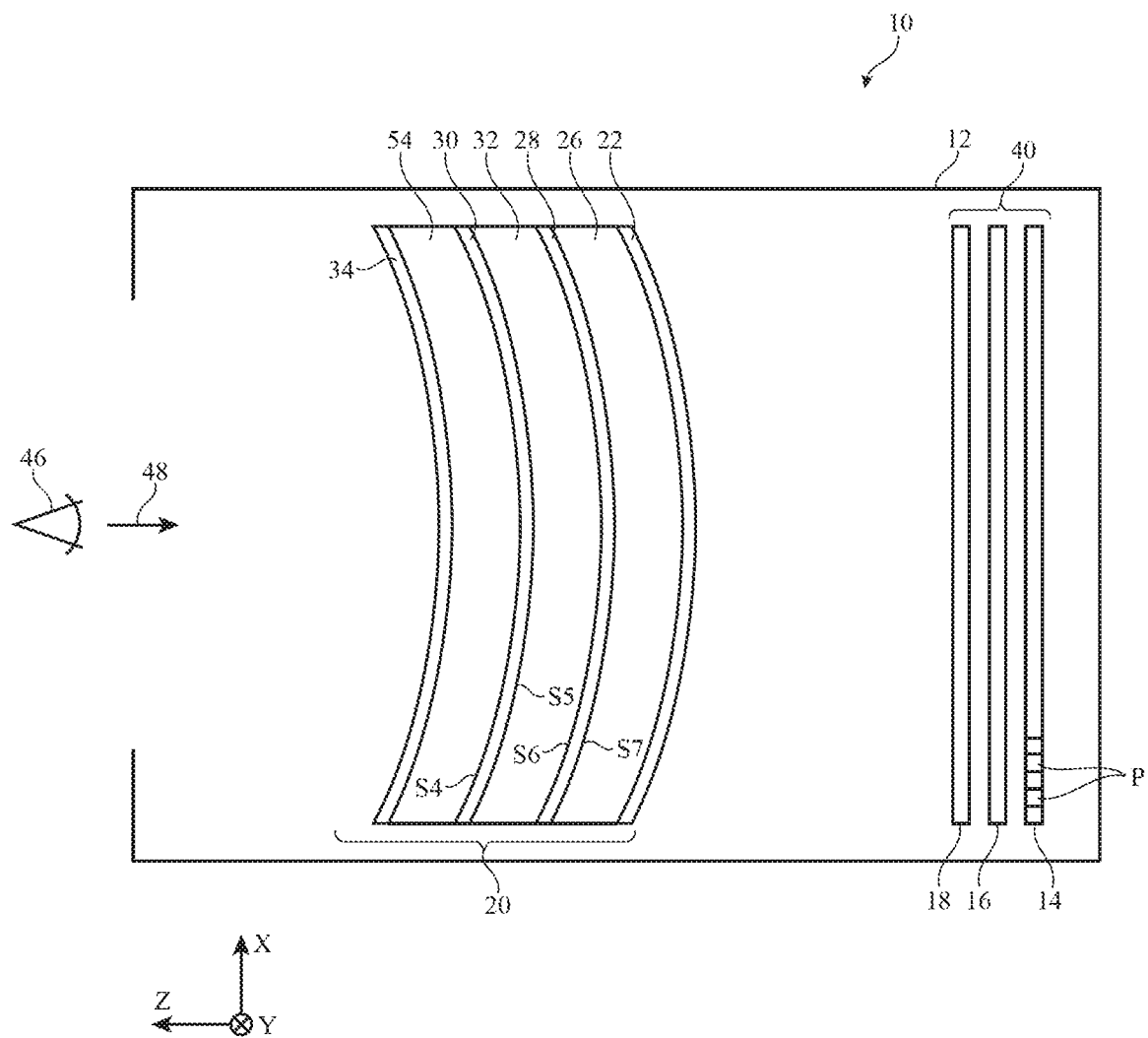
Figure 8:
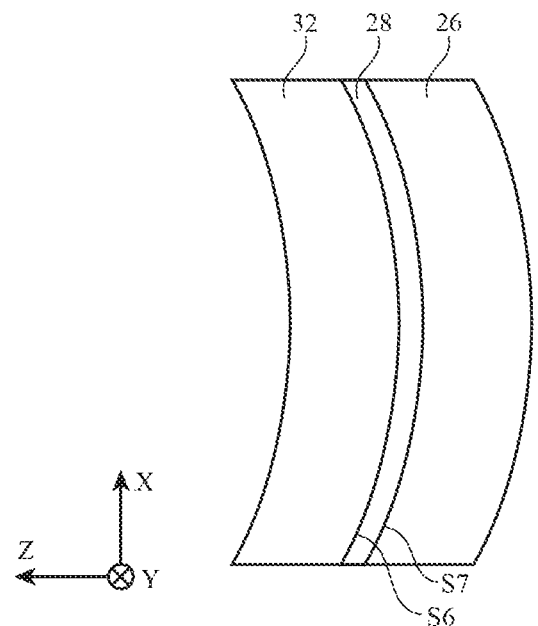
FIGS. 8 and 9 are respectively top and side views of lens elements with cylindrical surfaces in accordance with an embodiment.
Figure 9:
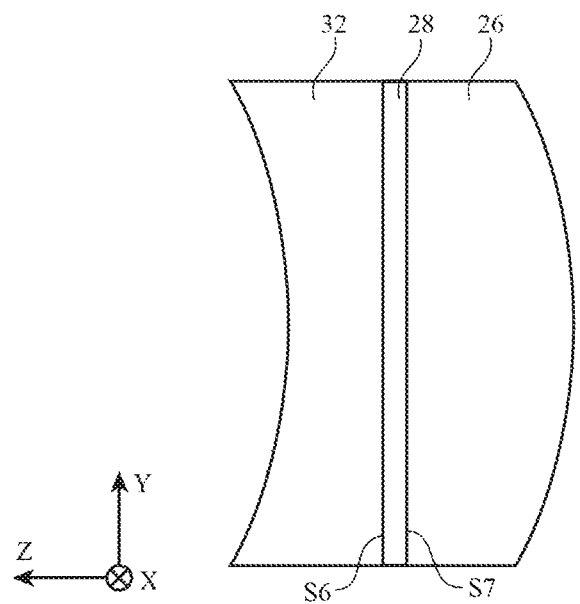

In the example of FIG. 6, surfaces S6 and S7 are planar. This helps avoid imposing undesired stresses on quarter wave plate 28 (which may, as an example, be formed from a birefringent stretched film). Another illustrative arrangement for minimizing quarter wave plate stress is shown in FIG. 7. In the example of FIG. 7, surfaces S6 and S7 have a cylindrical curved shape (S6 is convex and S7 is concave so that these cylindrical shapes mate). Although quarter wave plate 28 of FIG. 7 is curved, quarter wave plate 28 is only bent (curved) about a single axis (the Y axis) and is not bent about the X axis. As a result, quarter wave plate 28 does not have compound curvature that might impose undesired stresses on quarter wave plate 28. For comparison, FIGS. 8 and 9 show cross-sectional side views of lens elements 32 and 26 of FIG. 7. FIG. 8 is a cross-sectional side view viewed along the Y axis. Quarter wave plate 28 is interposed between cylindrical surface S6 of lens element 32 and cylindrical surface S7 of lens element 26 and is bent about an axis parallel to the Y axis as shown in FIG. 8. FIG. 9, which is a cross-sectional side view of lens elements 32 and 26 of FIG. 7 viewed along the X axis, shows how surfaces S6 and S7 do not bend about the X axis. Because surfaces S6 and S7 have this cylindrical shape, quarter wave plate 28 does not exhibit compound curvature and is not exposed to undesired amounts of stress so that a relatively uniform retardance is provided by the quarter wave plate 28 across the lens assembly.

Figure 10:
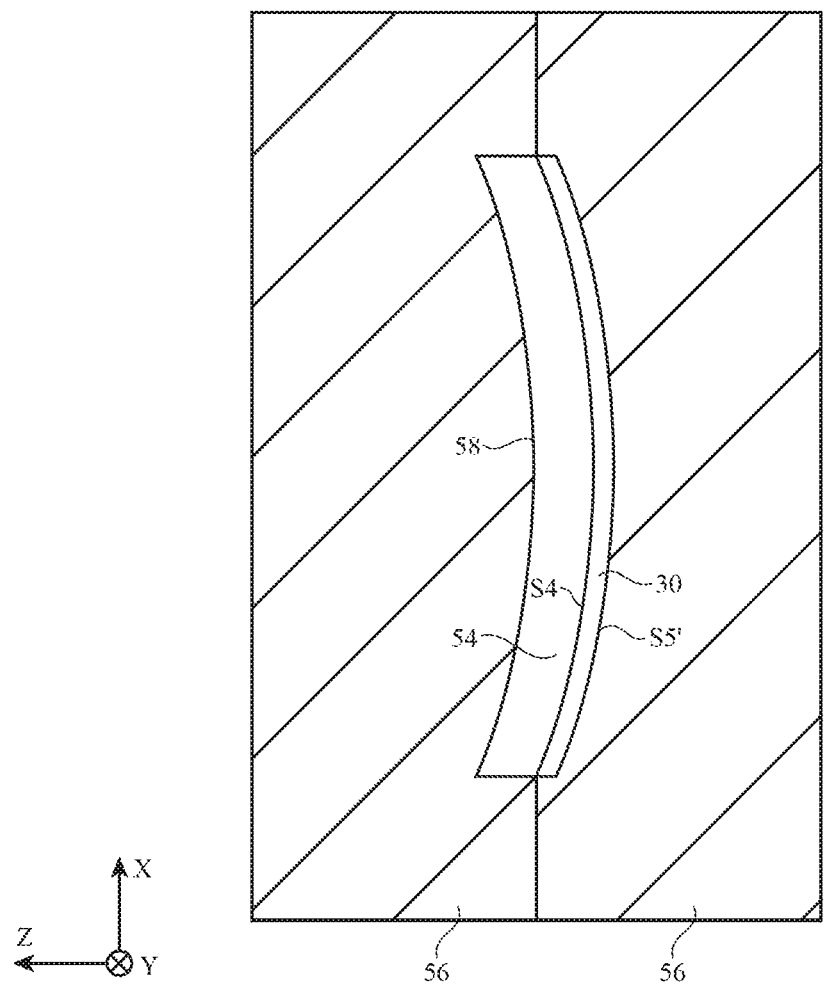
FIG. 10 is a diagram of an illustrative lens element and reflective polarizer during molding operations in a mold in accordance with an embodiment.

FIG. 10 shows how lens elements such as lens element 54 may be formed by injection molding of plastic (polymer) or other material into mold 56. Reflective polarizer 30 may be placed in mold 56 so that the reflective surface of reflective polarizer 30 bears against mold surface S5' as plastic is injected into the interior cavity of mold 56 to form lens element 54. Mold surface S5' can be machined with high accuracy, so pressing reflective polarizer 30 against surface S5' during molding operations will help enhance the smoothness and accuracy of the reflective surface of reflective polarizer 30. Similarly, if desired, reflective polarizer 30 can be formed by molding reflective polarizer 30 against opposing surface 58 during injection molding operations.

The lens elements used in optical system 20 may be relatively thin and formed of light-weight materials (e.g., plastic) and/or may be formed from materials such as glass. Reductions in weight may help provide user 46 with a comfortable viewing experience. It may be easier to mold the lens element(s) with uniform optical properties including low birefringence when lens elements such as element 54 have a uniform thickness.

As described in connection with FIGS. 8 and 9, quarter wave plate 28 may be interposed between lens elements 32 and 26 when elements 32 and 26 are bonded together (e.g., using adhesive layers on opposing sides of quarter wave plate 28). Surfaces S6 and S7 may be planar (e.g., element 32 may be a plano-concave element and element 26 may be a plano-convex element), as described in connection with FIG. 6, or surfaces S6 and S7 may be curved (see, e.g., FIG. 7). As described in connection with FIGS. 8 and 9, surfaces S6 and S7 can be cylindrical surfaces (surfaces bent around one axis). In this type of configuration, quarter wave plate 28 may bend along only one axis (e.g., quarter wave plate 28 may not have any compound curves), thereby reducing distortion in quarter wave plate 28 and helping to ensure that the retardation provided by quarter wave plate 28 is uniform.

During assembly of optical system 20, a planar piece of quarter wave film may be placed between elements 32 and 26 with optical adhesive on either side of the quarter wave film. Elements 32 and 26 may then be forced together to distribute the adhesive and bend the quarter wave film about axis Y (an axis parallel to axis Y). Providing a cylindrically curved shape for surfaces S6 and S7 can enable the thickness of lens elements 32 and 26 to be reduced. The use of cylindrically curved shapes for surfaces S6 and S7 can help make for a more uniform thickness across the lens elements and thereby improve lens element moldability. When forming injection molded lens elements, uniformity of thickness in the mold cavity can help improve uniformity of flow of the molten plastic as it is being injected into the mold and the melt front flows across the mold cavity. The presence of a uniform flow during molding can be important for preventing flow lines in the molded lens, particularly when the lens element is thicker at the edge than the center. More uniform flow can also result in a lower birefringence in the molded lens elements. For catadioptric optical systems such as system 20, low birefringence in the lens elements helps to maintain control of the polarization state of the image light, so that stray light and ghosts are reduced and so user 46 is thereby provided with a high contrast image without stray light artifacts. Moreover, the cylindrically curved shape of wave plate 28 in configurations of the type shown in FIGS. 8 and 9 may help ensure that light rays in system 20 pass through quarter wave plate 28 with an angle that is closer to normal incidence than with planar wave plate configurations. As a result, the retardation provided by quarter wave plate 28 may be more uniform across the lens element and the image provided to user 46 may as a result be more uniform in contrast with fewer ghost artifacts.

In device 10, image light is converted from unpolarized light to linearly polarized light, to circularly polarized light, then back to linearly polarized light, back to circularly polarized light and finally back to linearly polarized light. For the conversion from linearly polarized light to circularly polarized light to occur fully so that polarization ellipticity is reduced, it may be desirable for quarter wave plates 28 and 18 to be accurately oriented relative to the polarization axis of the polarizers. For example, it may be desirable to accurately orient the fast axis of the quarter wave plate 18 at 45 degrees to the polarization axis (pass axis) of linear polarizer 16 and the fast axis of quarter wave plate 28 at 45 degrees to the polarization axis (pass axis) of reflective polarizer 30. The fast axes of the quarter wave plates may, for example, be oriented at 45 degrees to the polarization axes of the respective polarizers within +/−1.5 degrees or other suitable alignment tolerance. Accurate alignment of the quarter wave plates to the polarization axes of the polarizers helps ensure that light does not have a mixed polarization state (is not elliptically polarized). Accurate alignment therefore prevents portions of the image light from following unintended paths that form ghost images that degrade contrast and present stray light artifacts.

Linear polarizer 16 and quarter wave plate 18 may be aligned during lamination. For example, rolls of polarizer film and quarter wave film can be accurately aligned to one another in a rewinding process and laminated together with optically clear adhesive so that the alignment is maintained. The laminated polarizer/quarter wave film can then be attached to a substrate for mounting into the optical system or attached directly to a cover glass or other structure associated with pixel array 14. Emissive displays such as organic light-emitting diode displays and light-emitting diode displays formed from arrays of crystalline semiconductor light-emitting diode dies may provide unpolarized image light so that attaching a laminated polarizer/quarter wave film to the pixel array allows the display system to emit circularly polarized light.

Quarter wave plate 28 can also be accurately aligned with reflective polarizer 30. Reflective polarizer 30 can be formed in a curved shape (e.g., by thermoforming with heat and differential pressure or pressure forming), either directly to the concave surface of the lens element 32 or to a mold that matches the concave surface of the lens element 32 (e.g., mold 56 of FIG. 10). Either the quarter wave plate 28 or reflective polarizer 30 can then be aligned during an assembly process in which two lens elements 32 and 54 are bonded with reflective polarizer 30 and curved quarter wave plate 28. Either reflective polarizer 30 or the curved quarter wave plate 28 may, for example, be bonded to one of lens elements 32 or 54 and the remaining elements of system 20 may be oriented with a desired alignment accuracy. A polarimeter can be used to measure through optical system 20 during alignment to determine how much ellipticity is present and to use this information in guiding the alignment during assembly. In configurations of the type shown in FIG. 6, the interface between lens elements 32 and 26 is planar. In this type of configuration, quarter wave plate 28 can be bonded to the planar side of plano-convex lens element 26 and reflective polarizer 30 can be bonded to the concave side of plano-concave lens element 32. Lens elements 32 and 26 can then be rotated relative to one another while polarization ellipticity is measured. Once it is determined that the quarter wave plate 28 is aligned satisfactorily to reflective polarizer 30, the components of optical system 20 can be bonded together to preserve alignment.

If desired, dome optics (lens elements with dome-shaped surfaces) may be used to facilitate alignment of polarizer 30 and quarter wave plate 28. For example, convex surface S4 of element 54 and concave surface S5 of element 32 may be dome shaped, allowing these dome lens elements to be rotated relative to each other during alignment operations. Quarter wave plate 28 may be bonded between lens elements 32 and 26. Polarizer 30 may be formed on the surface of lens element 54. Dome lens element 54 may then be bonded to surface S5 of lens element 32 while aligning polarizer 30 and quarter wave plate 28. Dome lens element 54 can be rotated as needed before bonding to lens element 32 while polarimetric measurements are made to assess alignment accuracy. If desired, reflective polarizer 30 can be molded to surface S4 of lens element 54, as described in connection with FIG. 10 (e.g., using reflective polarizer 30 as an insert into mold 56). Applying pressure to the optical plastic for element 54 during molding forces reflective polarizer 30 against the wall of mold 56 during molding, so that the accuracy and smoothness of the reflective surface of reflective polarizer 30 (e.g., the outwardly facing surface of reflective polarizer 30) is determined by the accuracy and smoothness of the wall of mold 56, which can be formed to optical specifications. After molding, the thickness of molded dome lens 54 (e.g. 1 to 3 mm) maintains the surface accuracy of the reflective surface of reflective polarizer 30 for ease of handling during assembly. The process of bonding dome lens 54 to the mating dome-shaped surface S5 of lens element 32 (e.g. using liquid optically clear adhesive) can then be of sufficiently low force that the as-molded surface accuracy of the reflective surface of reflective polarizer 30 on surface S4 of element 54 is not degraded.

As shown in FIG. 6, linear polarizer 34 may be formed on the eye side (concave surface S8) of element 54 to help prevent spurious reflections of light from the environment. Linear polarizer 34 can be a separate layer, either flat or curved, positioned between optical system 20 and user's eye 46. Linear polarizer 34 can also be attached to surface S8 of lens element 54 (e.g., an inner dome lens surface) or can be laminated to reflective polarizer 30 before polarizer 30 is formed on surface S4 of lens element 54. Linear polarizer 34 may be aligned relative to reflective polarizer 30 so the pass axes of the two polarizers are aligned. In this way, linear polarizer 34 absorbs light from the environment that has the polarization state that would be reflected by reflective polarizer 30. Light from the environment that has the polarization state that is transmitted by both linear polarizer 34 and reflective polarizer 30 passes through quarter wave plate 28 and quarter wave plate 18 ending with a linear polarization state that is absorbed by linear polarizer 16. This helps reduce stray light reflections, because reflective polarizer 30 reflects light of this polarization state with a high reflectivity, which has the potential to create distracting reflections of light entering device 10 from behind or to the side of user 46. At the same time, linear polarizer 34 is aligned so the transmission axis of the linear polarizer 34 is parallel to the transmission axis of reflective polarizer 30 and thereby helps enable linear polarizer 34 to serve as a cleanup polarizer to improve the quality of images from pixel array 14 while reducing the brightness of the image light presented to the eye of the user by a relatively small amount (e.g., <20% if linear polarizer 34 has a transmission of 40% and <10% if linear polarizer 34 has a transmission of 45%). Linear polarizer 34 may be a high transmission polarizer with a transmission of at least 40%, at least 43%, or at least 45% compared to unpolarized light.

In an embodiment, quarter wave plates 28 in system 20 may be formed from multiple layers of retarder films laminated together. The layers of retarder films may be oriented at angles to one another so that together they act as a quarter wave plate with reduced variation in retardation as measured in waves over a broader spectral bandwidth, also known as an achromatic quarter wave. For example, the retardation of quarter wave plates 18 and/or 28 may be within +/−1.5° over a wavelength range of 450-650 nm).

A primer (e.g., an adhesion promoting polymer) may be applied to one or more surfaces of reflective polarizer 30 prior to insert molding of dome lens element 54. This may help increase the bond strength between reflective polarizer 30 and dome lens element 54 after molding.

Reflective polarizer 30 may, if desired, have a substrate formed from a material such as polycarbonate or cyclic olefin that matches the thermal expansion of the lens elements in system 20 (e.g. acrylate or cyclic olefin lens elements), thereby reducing interfacial stress when optical system 20 is exposed to heat either from display system 40 or the environment.

If desired, lens element 26, which is interposed between the other lens elements of system 20 and display system 40 may be made from glass (which may have lower thermal expansion and higher heat resistance capabilities than plastic) to help resist heat effects from display system 20. In addition, a soft adhesive or an optical grease may be used to cement quarter wave plate 28 between lens elements 54 and 32 to enable some differential thermal expansion with reduced interfacial stress between the two lens elements and quarter wave plate 28.

The foregoing is merely illustrative and various modifications can be made to the described embodiments. The foregoing embodiments may be implemented individually or in any combination.

What is claimed is:

1. A head-mounted display configured to display images viewable by a user, comprising:
    an array of pixels configured to produce the images;
    a linear polarizer through which light associated with the images passes;
    a first planar quarter wave plate that receives the light from the linear polarizer;
    a first lens element having a first surface that is convex and having an opposing second surface;
    a partially reflecting mirror on the first surface;
    a second quarter wave plate at the second surface;
    a second lens element having a third surface at the second quarter wave plate and an opposing fourth surface that is concave;
    a reflective polarizer at the fourth surface; and
    a third lens element having a fifth surface and opposing sixth surface, wherein the second lens element is interposed between the first and third lens elements and wherein the third lens element is a dome lens.

2. The head-mounted display defined in claim 1, wherein the fifth surface is attached to the reflective polarizer.

3. The head-mounted display defined in claim 1, wherein the linear polarizer is a first linear polarizer and wherein the head-mounted display further comprises:
    a second linear polarizer, wherein the reflective polarizer is interposed between the second linear polarizer and the second lens element.

4. The head-mounted display defined in claim 3, wherein the reflective polarizer is attached to the fifth surface and wherein the second linear polarizer is attached to the sixth surface.

5. The head-mounted display defined in claim 3, wherein the second linear polarizer is interposed between the fifth surface and the reflective polarizer.

6. The head-mounted display defined in claim 5, wherein the fifth surface is interposed between the sixth surface and the second linear polarizer.

7. The head-mounted display defined in claim 3, wherein the second linear polarizer is a separate layer formed between the sixth surface and the user.

8. The head-mounted display defined in claim 1, wherein the third lens element has a thickness that varies by less than 10%.

9. The head-mounted display defined in claim 1, wherein at least one of the fifth surface and the sixth surface is aspheric.

10. The head-mounted display defined in claim 1, wherein the reflective polarizer is insert molded onto the third lens element.

11. The head-mounted display defined in claim 1, wherein the reflective polarizer includes a primer on one or more surfaces.

12. The head-mounted display defined in claim 1, wherein the third lens element is attached to the second lens element with optically clear adhesive.

13. The head-mounted display defined in claim 1, wherein the third lens element comprises glass.

14. The head-mounted display defined in claim 1, wherein the third lens element comprises plastic.

15. The head-mounted display defined in claim 1, wherein the third lens element comprises more than one material.

16. A head-mounted display configured to display images viewable by a user, comprising:
   an array of pixels configured to produce the images;
   a first linear polarizer through which light associated with the images passes;
   a first planar quarter wave plate that receives the light from the linear polarizer;
   a first lens element having a first surface and an opposing second surface;
   a partially reflecting mirror on the first surface;
   a second quarter wave plate at the second surface;
   a second lens element having a third surface at the second quarter wave plate and an opposing fourth surface;
   a reflective polarizer at the fourth surface;
   a third lens element having a fifth surface and opposing sixth surface, wherein the second lens element is interposed between the first and third lens elements and wherein the third lens element is a dome lens; and
   a second linear polarizer, wherein the reflective polarizer is interposed between the second linear polarizer and the second lens element.

17. The head-mounted display defined in claim 16, wherein the reflective polarizer is attached to the fifth surface and wherein the second linear polarizer is attached to the sixth surface.

18. The head-mounted display defined in claim 16, wherein the second linear polarizer is interposed between the fifth surface and the reflective polarizer and wherein the fifth surface is interposed between the sixth surface and the second linear polarizer.

19. A head-mounted display configured to display images viewable by a user, comprising:
   an array of pixels configured to produce the images;
   a first lens element having a first surface that is convex and having an opposing second surface, wherein the first surface is interposed between the array of pixels and the second surface;
   a partially reflecting mirror on the first surface;
   a quarter wave plate at the second surface;
   a second lens element having a third surface at the quarter wave plate and an opposing fourth surface;
   a reflective polarizer at the fourth surface; and
   a dome lens having a fifth surface and opposing sixth surface, wherein the second lens element is interposed between the first lens element and the dome lens.

20. The head-mounted display defined in claim 19, wherein the dome lens has a thickness that varies by less than 10%.

* * * * *